June 18, 1968 J. B. LE POOLE 3,389,252
ELECTRON MICROSCOPE HAVING A FOUR-POLE ELECTRON-OPTICAL
LENS ASSEMBLY AND A SCANNING LINE-LIKE ELECTRON BEAM
Filed June 4, 1965 3 Sheets-Sheet 1

INVENTOR.
JAN B. LE POOLE
BY
AGENT

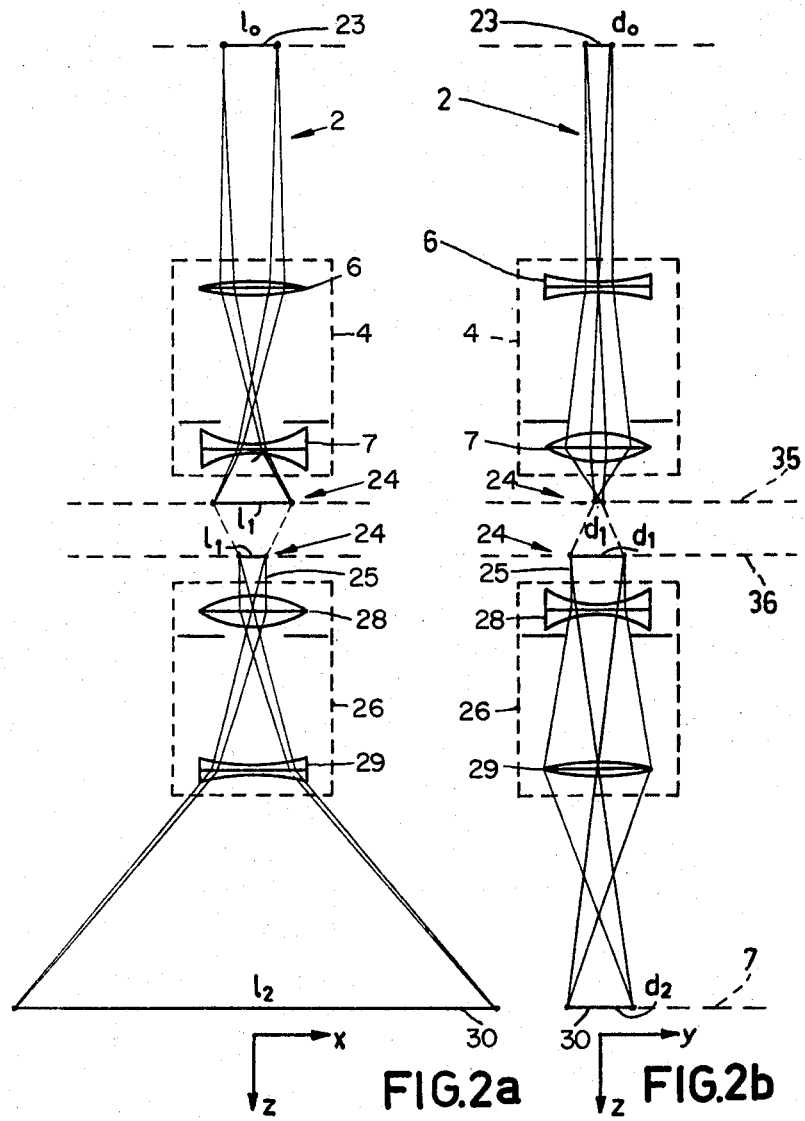
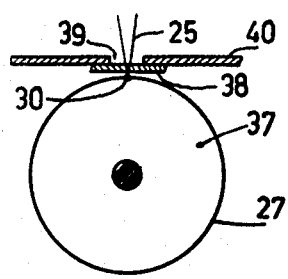
FIG.2a  FIG.2b
FIG.3

INVENTOR.
JAN B. LE POOLE
BY
AGENT

United States Patent Office 3,389,252
Patented June 18, 1968

3,389,252
ELECTRON MICROSCOPE HAVING A FOUR-POLE ELECTRON-OPTICAL LENS ASSEMBLY AND A SCANNING LINE-LIKE ELECTRON BEAM
Jan Bart Le Poole, Delft, Netherlands, assignor to North American Philips Company, Inc., New York, N.Y., a corporation of Delaware
Filed June 4, 1965, Ser. No. 461,379
Claims priority, application Netherlands, June 11, 1964, 6,406,599
10 Claims. (Cl. 250—49.5)

ABSTRACT OF THE DISCLOSURE

An electron microscope in which an electron beam is focussed on the specimen and with which, by a relative movement between the said beam and the specimen the latter is scanned. Means are also provided for obtaining a reproduction of the specimen projected on an image carrier by intercepting electrons influenced by the specimen. Thus the microscope permits not only a greater intensity of the electron beam focussed on the specimen, but also employs in the microscope itself electron lenses which can more simply be corrected.

Figures 1A, 1B, 1C:
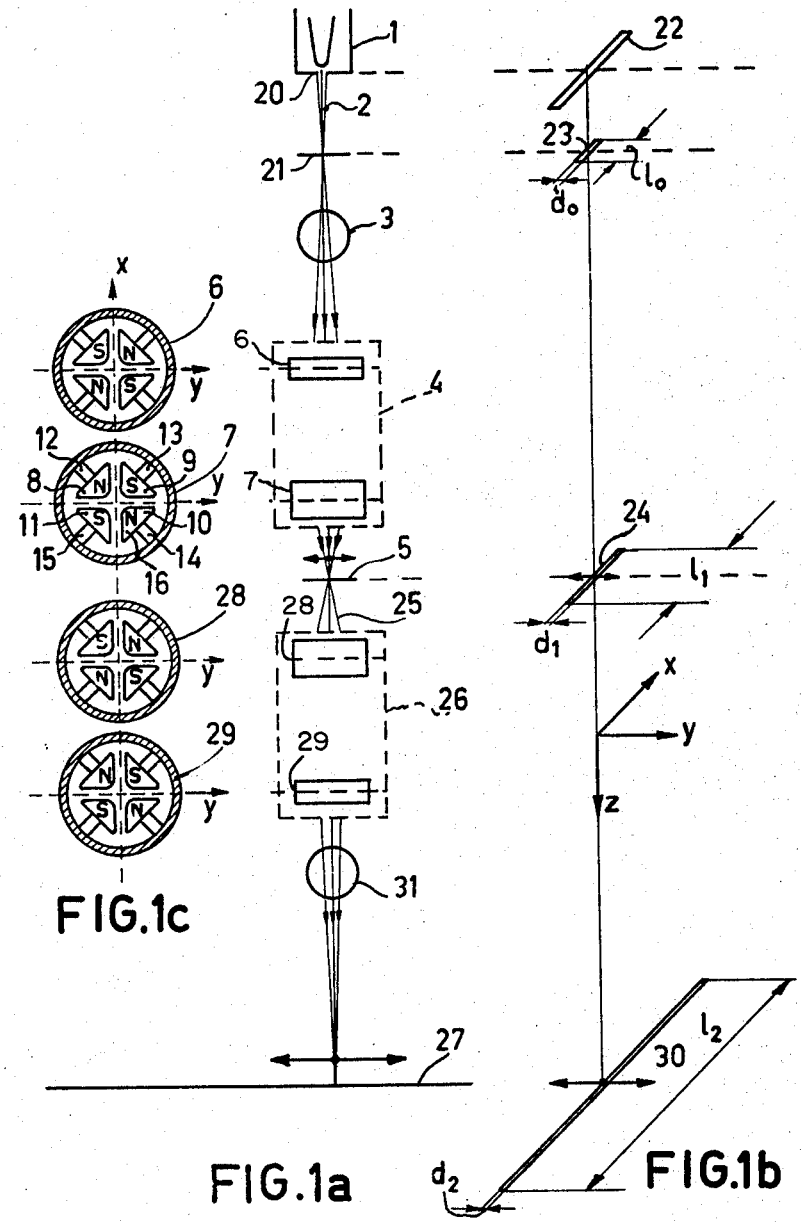

My invention relates to an electron microscope in which an electron beam is focussed on the specimen and with which, by a relative movement between the said beam and the specimen the latter is scanned. Means are also provided for obtaining a reproduction of the specimen projected on an image carrier by intercepting electrons influenced by the specimen. A microscope of the said type will hereinafter be referred to as a "scanning microscope."

In a known scanning microscope the electron beam is focussed in a minute spot on the specimen and the electrons passed by the specimen are received by a photographic plate after passing a diaphragm. This photographic plate is arranged on a cylindrical drum which is rotatable about its axis and can be moved in its longitudinal direction, or by an electrode, e.g. of an electron multiplier. In the latter case a signal is obtained which, after amplification, if required, is applied to a cathode ray tube, the writing beam of which performs a scanning movement in synchronism with the scanning movement of the electron beam focussed on the specimen. In this known scanning microscope the intensity of the electron beam focussed on the object is small, as a result of which the writing, or recording of the image either is rather time-consuming or requires a considerable amount of apparatus.

It is an object of my invention to provide a scanning microscope which permits not only a greater intensity of the electron beam focussed on the specimen giving all the advantages of simplicity of the means for directly making visible the image of the specimen, but which also employs in the microscope itself electron lenses which can more simply be corrected.

This and further objects of the invention will appear as the specification progresses.

According to the invention I have found that the electrons of the beam influenced by the specimen and focussed on the specimen can supply the desired reproduction of the specimen with one or more electron lenses. Moreover, in that case the electron beam focussed on the specimen need not necessarily be focussed in a minute spot on this specimen, but may have at that area a cross-section in the form of a thin line for which purpose one or more four-pole lenses may be used which can easily be corrected for spherical aberration.

Thus, in accordance with the invention an electron microscope of the type mentioned above includes a focussing system which focusses the electron beam, hereinafter referred to as the scanning beam, on the specimen in the form of a thin line with an accurately defined small width. The focussing system, for that purposes, is provided at least on the side of the specimen with a four-pole lens. A beam, hereinafter referred to as the image beam, of electrons influenced by the specimen is focussed on the image carrier by means of an electron-optical reproducing system in a manner such that a line-like reproduction with a magnified corresponding longitudinal direction corresponding to the line-like part of the specimen radiated at that moment by the scanning beam is formed on the image carrier. The reproduction system is provided, for this purpose, also at least on the side of the specimen with a four-pole lens. Further means also are present for effecting a relative movement between the image beam and the image carrier which movement is at right angles to the longitudinal direction of the instantaneous line-like image and runs in synchronism with the movement between the scanning beam and the specimen. The latter movement is transverse to the longitudinal direction of the line-like part of the specimen which, at that moment, is radiated by the scanning beam. The amplitudes of the relative movement between the image beam and the image carrier and that of the relative movement between the scanning beam and the specimen in this sequence preferably are proportional to the magnification of the reproduction system measured in the longitudinal direction of the instantaneous linear reproduction. As a result of this the reproduction formed by the image beam is of the same form as the part of the specimen covered by the scanning beam.

Although it is possible in principle to obtain an acceptable reproduction with only one four-pole lens in the focussing system and the reproduction system respectively, it is preferable, particularly in order to obtain a greater intensity of the scanning beam and the image beam impinging upon the image carrier, respectively, to provide at least one of these systems, and preferably both systems, with a second four-pole lens which is rotated 90° in its plane with respect to the first lens. This second four-pole lens is arranged, in the case of the focussing system, at a distance before the first and, in the case of the reproduction system, at a distance after the first lens.

The electron microscope according to the invention may be constructed as a transmission-type electron microscope, i.e. a microscope in which the image is formed by electrons which have passed through the specimen. In this case the focussing system and the reproduction system are arranged on different sides of the specimen and the corresponding four-pole lenses therein are rotated 90° around the axis with respect to each other.

In another embodiment of the invention the microscope is constructed as a mirror microscope, i.e. a microscope in which the image is formed by electrons reflected by the specimen, the scanning beam and the image beam passing through the image producing system which is identical to the focussing system in opposite directions.

Figure 4A:
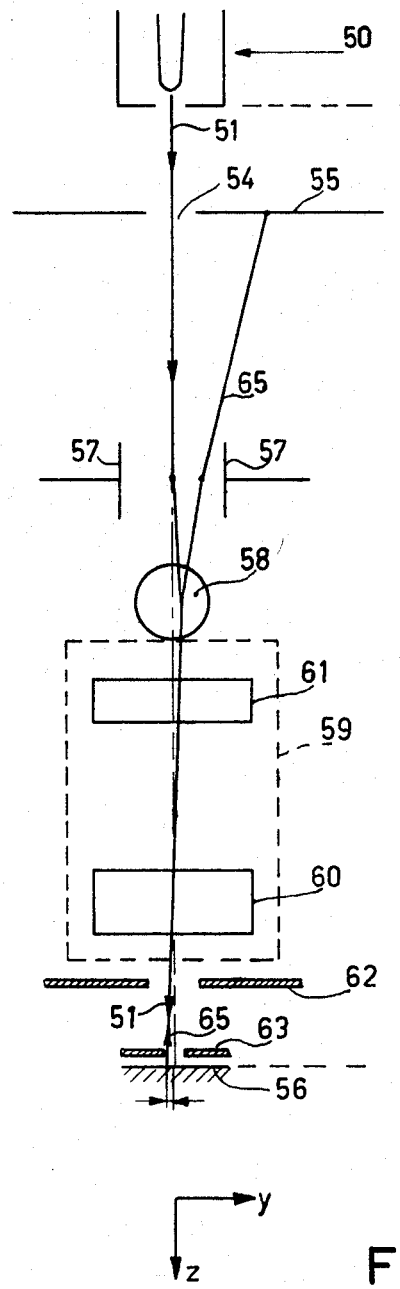

The invention will now be described in greater detail with reference to the accompanying drawing in which:

FIGS. 1a, b and c show diagrammatically the construction of a transmission-type electron microscope;

FIGS. 2a and b show diagrammatically the path of rays in two planes of the microscope shown in FIG. 1 at right angles to one another;

FIG. 3 shows a detail of the image carrier;

FIGS. 4a and b, show diagrammatically the construction of and the path of rays in a "mirror-type" electron microscope according to the invention.

In the drawing, FIG. 1a shows a longitudinal plan view of a scanning microscope according to the invention for tion a cross-section of the electron beam in various planes; transmission images; FIG. 1b shows in isometric projec- FIG. 1c shows schematically a cross-sectional view of various four-pole lenses present in the microscope.

An electron beam 2 emerging from an electron gun 1 is received, after passing one or several deflection fields (well-known in this art) which are symbolically indicated by 3, a focussing system 4 and focussed onto a specimen 5. In the present case the focussing system 4 comprises two spaced apart magnetic four-pole lenses 6 and 7. The four-pole lens 7, which is the more important in the system 4, is arranged on the side of the specimen 5 to substantially coincide with the focus of the beams which are converged by the lens 7. This lens 7 comprises four magnet poles 8, 9, 10 and 11 arranged at an equal distance around the axis of the lens with two oppositely located poles having the same polarity (see FIG. 1c). In this case the poles 8 and 10 are north poles and the poles 9 and 11 are south poles. In the present case this polarity of the poles has been obtained by arranging them on the inwardly directed end of columns 12 to 15 which extend in a radial direction. These columns which are either permanently magnetic, or are each provided with an energizing winding (not shown), are connected at their other ends to a ring 16 of a magnetically permeable material.

The four-pole lens 6 is located closer to the electron gun 1 and has a construction similar to that of the lens 7. This lens 6, which is considerably weaker than the lens 7, is rotated 90° about its axis as compared with the latter lens. Since the lenses 6 and 7 are not rotationally symmetrical the simplest thing to do is to introduce in the further description a rectangular system of coordinates XYZ (see FIG. 1b). The direction Z coincides with the direction of the electron beam 2 and thus also with the axial direction of the four-pole lenses 6 and 7; the direction Y lies in the plane of FIG. 1a of the drawing; and the direction X is at right angles to this plane of the drawing. The cross-sections shown in FIG. 1c at right angles to the axis of the four-pole lenses 6 and 7 consequently shown a cross-section with an XY-plane.

The electron beam 2 leaves the electron gun through a narrow gap 20, at the area of the so-called cross-over 21, has its smallest cross-section at least as far as the part of this beam up to the focussing sytem 4 is concerned. FIG. 1b shows the cross-section of the electron beam 2 with an XY-plane at different heights. After the electron beam 2 leaves the electron gun 1 it has an elongated substantially rectangular cross-section 22 which is reduced to a smaller rectangle 23 at the area of the crossover 21. The longitudinal direction of this rectangle 23 extends in the direction X, and has dimensions which are denoted $l_0$ in this longitudinal direction and $d_0$ at right angles thereto. With the focussing system 4 this rectangle 23 is reproduced on the specimen 5 as an extremely thin line 24 which extends parallel to the longitudinal direction of the rectangle 23. The length $l_0$ of this line is of the same order of magnitude as the length $l_0$ of the rectangle 23; $l_1$ may be, for example, a few times larger but, possibly, also somewhat smaller than $l_0$. The sharply defined width $d_1$ of the line 24, however, has become extremely small as a result of the strong convergence of the lens 7 in the ZY-plane and may be in the order of magnitude of approximately 10 to 100 A.

By means of the deflection means 3 (shown symbolically) the electron beam 2 is given a scanning movement which extends at right angles to the longitudinal direction of the line 24. As a result thereof, the specimen 5 is scanned by the movement of the beam 2, which for that reason is referred to as scanning beam, in the direction Y by the line 24. The deflection means 3 may consist, for example, of a magnetic field which varies with time and extends in the direction X, of an electric field which varies with time and extends in the direction Y, or of a combination of such fields.

On the side of the specimen 5 opposite to the side where the focussing system 4 and the electron gun 1 are located an electron optical reproducing system 26 is arranged. This system receives electrons which are passed by the specimen 5, which electrons form a beam 25 which is referred to as the image beam. The system 26 forms an electron image of the surface element of the specimen 5 instantaneously radiated by the scanning beam and corresponding to the line 24 on an image carrier 27 which may consist of a photographic plate or a luminescent screen. The reproduction system 26 is constructed in a manner similar to that of the focussing system 4 and comprises on the side of the specimen 5 a strong four-pole lens 28 and a much weaker four-pole lens 29 arranged at a considerable distance behind it. Of the two four-pole lenses 28 and 29, the former assumes a position which corresponds to a rotation of 90° about the axis as compared with that of the lens 7 in the focussing system 4, while the lens 29 is again rotated 90° in its plane with respect to the lens 28 and consequently assumes the same position as the lens 7. The result thereof is that when the scanning beam 2 moves, the surface element of the specimen 5 instantaneously corresponding to the line 24 is reproduced each time on the image carrier 27 in the form of a line 30 having a length $l_2$ and a width $d_2$. When the line 24 is reproduced on the image carrier 27 a strong magnification in the longitudinal direction of the line 24 occurs as a result of the configuration of the reproducing system 26 whereas the magnification at right angles hereto, i.e. in the X-direction, is naturally considerably smaller. By using deflection means symbolically indicated by 31 (also well-known in this art) in FIG. 1a with which the image beam 25 is deflected synchronously and in phase with the scanning movement of the beam 2 at right angles to the longitudinal direction of the line 30, the magnified reproduction of the part of the specimen 5 covered by the beam 2 is obtained on the image carrier 27. This reproduction is equal in form to the part of the specimen being scanned when the speed at which the image beam 25 moves over the image carrier is larger by a number of times, equal to the linear reproduction magnification of the reproduction system 26, than the speed at which the scanning beam 2 moves over the specimen 5. In other words this condition is met when the amplitude of the scanning beam 2 at the area of the specimen 5 and that of the image beam 25 at the area of the image carrier 27 in this sequence are in the proportion of the linear magnification of the reproduction system in the XZ plane to one. The resulting reproduction on the image carrier 27 is a normally magnified image with linear magnification in all directions equal to the linear reproducing magnification of the system 26. When this linear reproduction magnification of the system 26 in the XZ plane is not sufficient for the possible definition of the image which in principle is determined by the extremely small width $d_1$ of the line 24 to appear to full advantage a second similar reproduction system can be introduced between the system 26 and the image carrier. The latter system then is located further on, which second system projects the line image 30 which, in this microscope is formed at the area of the image carrier 27 shown in this FIG. 1a on this image carrier. The latter is located further on and forms a line image of the line image 30 on the image carrier which, compared with the line image 30 is further magnified in the longitudinal direction thereof and, in the direction at right angles thereto, is magnified only slightly.

It will not always be necessary that the image formed on the image carrier is wholly of the same form as the part of the specimen 5 covered by the scanning beam 2. When the magnification of the longitudinal direction of the line 24 is larger than is necessary for observing the desired details, the amplitude of the scanning movement of the image beam may be reduced proportionally to that at which a similar reproduction is obtained without the observation of the details of this scanning direction being adversely influenced. Opposing an increase of the quantity of information per surface unit of the image carrier, in other words an increase of the quantity of information at a given image surface, is the drawback, however, of a non-uniform reproduction in that the image in the direction Y is compressed as compared with the direction X.

The instantaneous path of rays in the scanning microscope of FIG. 1 is shown in greater detail in FIGS. 2a and b, although diagrammatically they are not in the correct proportions. FIGS. 2a and b show the path of rays in two planes at right angles to each other and passing through the axis of the beams 2 and 25. FIG. 2a shows the path of rays in the XZ plane while FIG. 2b that in the YZ plane. In the XZ plane the weak lens 6 and the strong lens 28 are both positive. The strong lens 7 and the weak lens 29, on the contrary, are both negative. In the YZ plane just the reverse is the case. After the above explanation with reference to FIG. 1, further explanation will not be necessary although it is noted that, in the interest of clarity FIGS. 2a and b which serve to illustrate this principle show a discontinuity occurring at the area of the specimen 5 which of course does not occur in practice. FIGS. 2a and b both show two spaced-apart lines 35 and 36 indicating the plane of the specimen 5, the first line being associated with the focussing system 4 the second line with the reproduction system 26. The dimensions $l_1$ and also the dimensions $d_1$ of the line 24 are shown differently in these planes exclusively in the interest of clarity in the figures.

It should be noted that the place shown in FIG. 1a of the deflection field or fields 3 for the scanning beam 2 and that of the deflection field or fields 31 for the image beam 25, respectively, are by no means obligatory and that these fields could be arranged in any of the many other positions along those beams as is well-known in this art.

The importance of the use of the four-pole lenses in the electron microscope according to the invention is that these lenses can more easily be made substantially free from spherical aberration in known manner than the commonly used rotationally symmetrical lenses with an axial field. In the microscope shown in FIG. 1a it is in particular the strong lenses 7 and 28 located nearest to the specimen that might adversely influence by their possible spherical aberration the resolving power which is given in principle by the width $d_1$ of the line 24. A high resolving power can be obtained in the first instance by constructing the lenses as four-pole lenses and correcting them in a known and simple manner for spherical aberration. If required, an eight-pole lens may be incorporated for further correction in one or each of the systems 4 and 26.

It has already been stated above that for obtaining a greater magnification than is possible with the reproduction system 26 only a second similar system may be arranged between this system and the image carrier 27 which in that case is arranged farther away from the specimen. However, it is not necessary that this second system be similar to the system 26, since the electron-optical aberrations of this second system are of less importance than those of the system 26. Consequently, when the magnification of the system 26 is insufficient, often a commonly used rotationally symmetrical electron lens may be used as the second system which need not be fully corrected.

The focussing system 4 also as described above may be preceded by one or more other electron lenses which need not be four-pole lenses. For example, preceding the focussing system 4, the scanning beam emerging from the electron gun 1 might be concentrated to a beam having an oblong rectangular cross-section without the aperture of the gun where the beam emerges being elongated as in the case shown in FIG. 1a, by using an electric double lens which differs from the commonly used rotationally symmetrical shape in that the apertures in the three electrodes arranged at right angles to the direction of the scanning beam are rectangular instead of circular.

In addition it is noted that the presence of the weak four-pole lenses 6 and 29 is not strictly necessary but that in principle it is sufficient to use the strong four-pole lenses 7 and 29 as desired preceded by another type of reducing condenser lens or succeeded by a different type of magnifying reproducing lens. This results in a not exactly defined length $l_1$ of the line 24 on the specimen 5 and a not exactly defined width $d_2$ of the line image 30 on the image carrier respectively, but this may be mitigated by using a diaphragm limiting the length $l_1$ and the width $d_2$ respectively. However, this results in an intensity loss both at the area of the specimen and at the area of the image carrier. In addition, for restricting the line width $d_2$, the diaphragm will have to follow the scanning movement of the image beam at the area of the image carrier unless an embodiment is used which differs from the embodiment shown in FIG. 1a substantially with reference to the image carrier.

A detail relating to image carrier of such another embodiment is shown in FIG. 3. This other embodiment differs from that shown in FIG. 1a in principle only in that in this case the image beam 25 does not perform a lateral scanning movement with respect to a stationary image carrier, but that the image carrier is displaced with respect to the image beam 25 which is not deflected. Consequently in this embodiment there are no deflection means 31 (see FIG. 1a) for the image beam 25. The movement between the image beam 25 and the image carrier 27 is obtained by rotation of a cylindrical drum 37 around its axis on which drum the image carrier 27 is stretched. This drum, the axis of which runs in parallel with the longitudinal direction of the image line 30 formed by the image beam 25 on the image carrier 27 is arranged immediately below a narrow gap 39 in the vacuum-tight wall 40 of the microscope which passes the image beam 25 and is covered with a very thin Lenard-window 38. Consequently, the drum 37 with the image carrier 27 is located outside the vacuum of the microscope. This is in favor of its construction, maintenance and handiness. By way of example it may be mentioned that changing of the image carrier 27 (for example photographic film or luminescent screen) is possible without interrupting the vacuum. In view of the small dimensions required of the gap 39, the Lenard-window 38 may be very thin and as a result it hardly influences the electrons of the image beam 25.

FIGS. 4a and b show an example of the mirror microscope according to the invention. FIG. 4a shows diagrammatically the construction of this mirror microscope, whereas in FIG. 4b an isometric projection shows in particular various local cross-sections of the electron beam. In this case also a rectangular system of coordinates XYZ is introduced.

A scanning beam 51 emerging from an electron gun 50 and preferably having a somewhat elongated cross-section 52 (FIG. 4b) having its greatest dimension in the direction X when leaving the anode of this gun passes an aperture 54 in an image carrier 55, for example a luminescent screen, at the area of the cross-over (cross-section 53). The scanning beam 51 is directed to a specimen 56 which is to be reproduced on the image carrier. Before reaching the specimen, this beam traverses an electric deflection field between the electrodes 57, a magnetic deflection field 58 (shown symbolically) which is at right angles to the plane of the drawing, and an electron-optical system 59. The construction of the system 59 is the same as that of the focussing system 4 shown in FIGS. 1a and c and consequently comprises a strong four-pole lens 60 on the side of the specimen 56 and a weak four-pole lens 61 on the side of the gun 50. The lenses 60 and 61 are rotated about their axes through 90° with respect to each other.

Between the system 59 and the specimen 56 are two electrodes 62 and 63 each provided with an aperture. The first of these electrodes has a potential which is substantially equal to that of the anode of the electron gun. The electrode arranged closer to the specimen 56 has a potential which is lower than that of the specimen 56. The specimen has a potential which is slightly lower than that of the cathode of the electron gun. As is the case in the microscope of FIG. 1a, the action of the lens system 59 on the scanning beam 54 is such that, approximately at the area of the specimen, the beam cross-section has the shape of a sharply defined line 64 having a length $l_1$ and, not further shown in FIG. 4b, an extremely small thickness $d_1$.

The scanning beam 51 is given a scanning movement at right angles to the line 64 by deflection means 57 and 58. The electric field between the electrodes 57 and the magnetic field 58 is always directed so that the deflection given to the scanning beam by one field is oppositely directed to the deflection by the other field, so that the scanning movement of the beam 51 at the area of the specimen 56 is determined by the difference between these deflections.

Figure 4B:
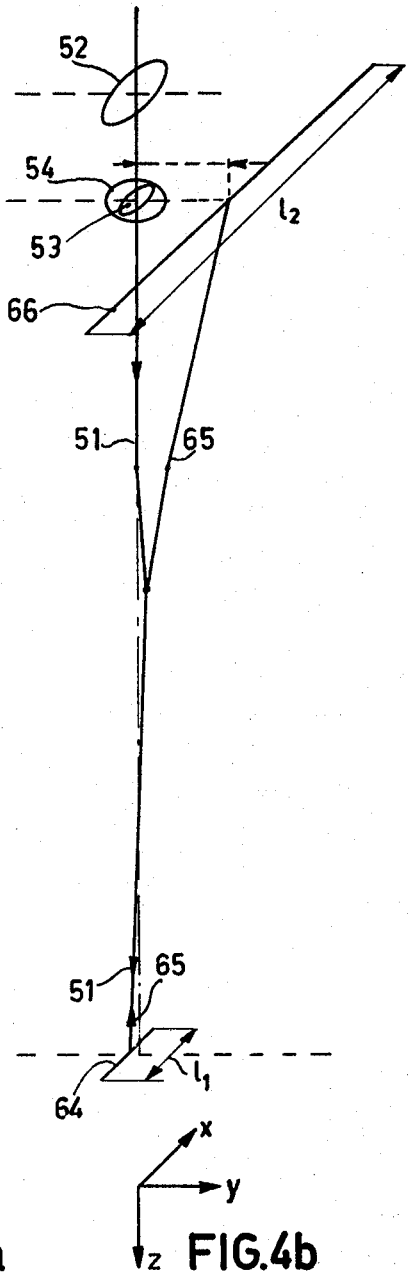

The electrons of the scanning beam 51 are reflected by the equipotential planes at the area of the specimen 56, the correct variation of those equipotential planes being influenced by the local surface condition of the specimen, and form an image beam 65, which, in FIG. 4b, initially coincides substantially with the scanning beam 51. The presence of the electrodes 62 and 63 causes a curvature of the equipotential planes in front of the specimen 56 working as a concave mirror, as a result of which the image beam contains more reflected electrons than would be the case without the presence of the electrode 63. The image beam 65 traverses the lens system 59 in the direction opposite to that of the scanning beam 51 so that the action of this system on the image beam is quite analogous to that of the system 26 on the traversing image beam 25 in the microscope shown in FIG. 1a. In this manner, a line image is formed reproducing strongly magnified in the longitudinal direction and considerably less magnified in the tranverse direction, the distribution of the potential of the surface of the specimen along a line 64, the position of which at each movement is determined by the position of the scanning beam 51. Since the image beam traverses the deflection means 58 and 57 in the direction opposite to that of the scanning beam 51, the deflection caused by the magnetic field 58 has the same direction as that caused by the electric field between the electrodes 57. As a result thereof, the image line 66 performs a movement through the image carrier 55 at right angles to the longitudinal direction of the line image line which movement is synchronous to the movement of the line 64 at the area of the specimen. By suitable choice of the strength of the deflection fields and the place thereof (which, in FIG. 4b is chosen rather arbitrarily in the interest of clarity) it can have the same relation to the scanning movement of the line 64 as that of the lengths $l_2$ and $l_1$ of the image line 66 and the line 64 respectively.

Instead of giving the scanning beam 51 and consequently the image beam 65 a deflection varying with time, the scanning of the specimen 56 may also be effected by displacing this specimen in the direction at right angles to the line 64. The place of the image beam 65 will then be stationary if no means are present to give this beam a scanning movement running in synchronism with the movement of the specimen independently of the scanning beam 51. To obtain a two-dimensional image the image carrier 55 may be moveably arranged and be moved in synchronism with the specimen 56. In that case it is preferable to arrange a rotatable drum outside the vacuum on which the image carrier is arranged analogous to the embodiment shown in FIG. 3.

Finally it is noted that although the invention has been described with reference to embodiments in which the four-pole lenses used are magnetic lenses, the invention is not restricted to the use of this type of lens since with the exception of those cases in which such a lens has a double function based on the different actions on electron beams passing through the lens in opposite directions, as in the embodiment shown in FIGS. 4a and b, electric four-pole lenses may be substituted for the magnetic four-pole lenses.

Therefore, while the invention has been described with reference to particular embodiments and applications, other modifications thereof will be apparent to those skilled in this art without departing from the spirit and scope of the invention as defined in the appended claims.

What I claim is:

1. An electron microscope comprising an electron beam source, means to scan a specimen with the electron beam, means to reproduce an image of a portion of the specimen intercepting the electron beam, and means including a four-pole electron-optical lens assembly positioned between the electron beam source and the specimen to focus the electron beam into a line on the surface of the specimen whereby an image beam corresponding to a line-like portion of the specimen is radiated and forms a line-like image having a magnified longitudinal direction on said image reproducing means, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

2. An electron microscope comprising an electron beam source, means to scan a specimen with the electron beam, means to reproduce an image of a portion of the specimen intercepting the electron beam, means including a four-pole electron-optical lens assembly positioned between the electron beam source and the specimen to focus the electron beam into a line on the surface of the specimen whereby an image beam corresponding to a line-like portion of the specimen is radiated and forms a line-like image having a magnified longitudinal direction on said image reproducing means, and means to effect a relative movement at right angles to the longitudinal direction of the line-like image between the image beam and the image reproduction means, said line-like image movement being in synchronism with the movement of the scanning beam relative to the specimen, the movement of the scanning beam relative to the specimen being transverse to the longitudinal direction of the line-like portion of the specimen intercepted by the beam and having a given amplitude, said movement of said line-like image beam relative to said image reproduction means having an amplitude proportional to the magnification of the reproduction means measured in the linear direction of the reproduced line-like image.

3. An electron microscope comprising an electron beam source, means to scan a specimen with the electron beam, means to reproduce an image of a portion of the specimen intercepting the electron beam, means including a first four-pole electron-optical lens assembly positioned between the electron beam source and the specimen and a second four-pole electron-optical lens assembly between said first electron-optical lens assembly and said source and spaced therefrom to focus the electron beam into a line on the surface of the specimen whereby an image beam corresponding to a line-like portion of the specimen is radiated and forms a line-like image having a magnified longitudinal direction on said image reproducing means, said second four-pole lens being weaker than said first four-pole lens and being rotated 90° in a plane passing therethrough relative to said first four-pole lens, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

4. An electron microscope comprising an electron beam source, means to scan a specimen with the electron beam, means to reproduce an image of a portion of the specimen intercepting the electron beam, first means including a four-pole electron-optical lens assembly to focus the electron beam into a line on the surface of the specimen whereby an image beam corresponding to a line-like portion of the specimen is radiated therefrom, second means including a four-pole electron-optical lens assembly to focus a line-like image corresponding to the line-like image radiated by the specimen having a magnified longitudinal direction on said image reproducing means, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

5. An electron microscope comprising an electron beam source, beans to scan a specimen with the electron beam, means to reproduce an image of a portion of the specimen intercepting the electron beam, first means including a first four-pole electron-optical lens assembly positioned between the electron beam source and the specimen and a second four-pole electron-optical lens assembly between said first electron-optical lens assembly and said source and spaced therefrom to focus the electron beam into a line on the surface of the specimen whereby an image beam corresponding to a line-like portion of the specimen is radiated therefrom, and second means including a first four-pole electron-optical lens assembly between said specimen and said reproducing means and a second four-pole electron-optical lens assembly between said first four-pole electron-optical assembly and said image reproducing means to focus a line-like image corresponding to the line-like image radiated by the specimen having a magnified longitudinal direction on said image reproducing means, said second electron-optical lens assembly of each of said first and second focussing means being weaker than the respective first electron-optical lens and being rotated 90° in a plane passing therethrough relative to the respective first electron-optical lens, and means to effect a relative movement at right angles to the longitudinal direction of the line-like image between the image beam and the image reproduction means, said line-like image movement being n synchronism with the movement between the specmen and the scanning beam, the movement of the scanning beam relative to the specimen being transverse to the longitudinal direction of the line-like portion of the specimen intercepted by the beam.

6. An electron microscope comprising an electron beam source, means to scan a specimen with the electron beam, means to reproduce an image of a portion of the specimen intercepting the electron beam, means including a four-pole electron-optical lens assembly to focus the electron beam into a line on the surface of the specimen whereby an image beam corresponding to a line-like portion of the specimen is radiated and forms a line-like image thereof which is focussed by said electron-optical lens into a line-like image having a magnified longitudinal direction on said image reproducing means, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

7. An electron microscope comprising an electron beam source, means to scan a specimen with the electron beam, means to reproduce an image of a portion of the specimen intercepting the electron beam, means including a four-pole electron-optical lens assembly to focus the electron beam into a line on the surface of the specimen whereby an image beam corresponding to a line-like portion of the specimen is radiated and forms a line-like image having a magnified longitudinal direction on said image reproducing means, an electrode having an aperture for the passage of the electron beam between the focussing means and the specimen whereby equipotential planes constituting hollow mirrors are produced between said electrode and the specimen, and means to effect a relative movement at right angle to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

8. An electron microscope comprising an electron beam source, means to produce an electric and a magnetic field to deflect the electron beam in opposite directions and thereby scan a specimen with the electron beam, means to reproduce an image of a portion of the specimen intercepting the electron beam, means including a four-pole electron-optical lens assembly to focus the electron beam into a line on the surface of the specimen whereby an image beam corresponding to a line-like portion of the specimen is radiated and forms a line-like image having a magnified longitudinal direction on said image reproducing means, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

9. An electron microscope comprising an electron beam source, means to produce an electric and a magnetic field to deflect the electron beam in opposite directions and thereby scan a specimen with the electron beam, means to reproduce an image of a portion of the specimen intercepting the electron beam, means including a four-pole electron-optical lens assembly to focus the electron beam into a line on the surface of the specimen whereby an image beam corresponding to a line-like portion of the specimen is radiated and forms a line-like image having a magnified longitudinal direction on said image reproducing means, said electric and said magnetic field deflecting said image beam in the same direction, and means to effect a relative movement at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

10. An electron microscope comprising an evacuated envelope and within the envelope an electron beam source, means to scan a specimen with the electron beam, means outside the envelope to reproduce an image of a portion of the specimen intercepting the electron beam, means including a four-pole electron-optical lens assembly to focus the electron beam into a line on the surface of the specimen whereby an image beam corresponding to a line-like portion of the specimen is radiated and forms a line-like image having a magnified longitudinal direction on said image reproducing means, said envelope having a window portion which transmits said electron image to said image reproducing means, and means to move the image reproducing means at right angles to the longitudinal direction of the line-like image between the image beam and the image reproduction means, said line-like image movement being in synchronism with the movement between the specimen and the scanning beam, the movement of the scanning beam relative to the specimen being transverse to the longitudinal direction of the line-like portion of the specimen intercepted by the beam.

References Cited

UNITED STATES PATENTS

| | | | |
|---|---|---|---|
| 2,257,774 | 10/1941 | Von Ardenne | 250—49.5 X |
| 2,330,930 | 10/1943 | Snyder | 250—49.5 |
| 2,919,381 | 12/1959 | Glaser | 250—49.5 X |

WILLIAM F. LINDQUIST, *Primary Examiner.*